(12) United States Patent
Majkrzak

(10) Patent No.: US 8,230,954 B2
(45) Date of Patent: Jul. 31, 2012

(54) PTO DRIVEN HYDRAULIC SYSTEM

(76) Inventor: David S. Majkrzak, West Fargo, ND (US)

( * ) Notice: Subject to any disclaimer, the term of this patent is extended or adjusted under 35 U.S.C. 154(b) by 105 days.

(21) Appl. No.: 12/843,548

(22) Filed: Jul. 26, 2010

(65) Prior Publication Data

US 2011/0036651 A1   Feb. 17, 2011

Related U.S. Application Data

(60) Provisional application No. 61/228,291, filed on Jul. 24, 2009.

(51) Int. Cl.
*B60K 17/28* (2006.01)
(52) U.S. Cl. .................................................. 180/53.4
(58) Field of Classification Search .............. 180/53.4, 180/53.6, 53.7, 53.8
See application file for complete search history.

(56) References Cited

U.S. PATENT DOCUMENTS

| | | | |
|---|---|---|---|
| 4,923,128 A | 5/1990 | Ostrowski | |
| 5,332,053 A | 7/1994 | Vachon | |
| 6,170,412 B1 | 1/2001 | Memory et al. | |
| 6,990,807 B2 | 1/2006 | Bird et al. | |
| 2008/0173483 A1* | 7/2008 | Phelps | 180/53.4 |

OTHER PUBLICATIONS

Eaton Hydraulic Paper, 1982, 31 pages.

\* cited by examiner

*Primary Examiner* — Faye M. Fleming
(74) *Attorney, Agent, or Firm* — Patterson Thuente Christensen Pedersen, P.A.

(57) ABSTRACT

A hydraulic system operably coupled to a vehicle, the vehicle having at least one PTO drive and having a hydraulic system for, in part, cooling hydraulic fluid, includes a closed hydraulic circuit having at least a first and a second hydraulic loop, a pump being a component of each of the at least a first and a second hydraulic loops, the pump being operably, rotatably coupled to the PTO drive, the first hydraulic loop having a feed line fluidly coupled to the vehicle hydraulic system and to the pump and a return line in fluid communication with the pump and operably, fluidly coupled to the vehicle hydraulic system; and the second hydraulic loop having a pressure line fluidly coupled to a output of the pump and a return line fluidly coupled to a pump return inlet, the second hydraulic loop being fluidly couplable to an implement for providing hydraulic power thereto. A method of forming the hydraulic system is included.

18 Claims, 14 Drawing Sheets

PTO DRIVEN HYDRAULIC SYSTEM

RELATED APPLICATION

This application claims the benefit of U.S. Provisional Application No. 61/228,291 filed Jul. 24, 2009, which is hereby fully incorporated herein by reference.

BACKGROUND OF THE INVENTION

Tractors typically have a rear mounted, rear facing power take-off shaft that is driven by the engine of the tractor through a clutch. The shaft is typically splined in order to facilitate coupling PTO-driven implements to the tractor.

There is a need, especially with small tractors that have a limited hydraulic pump, for an auxiliary system that will provide sufficient hydraulic pressure and flow to drive hydraulically powered implements, such as, for example, a snow blower, a broom, or a loader. In the past, PTO driven auxiliary hydraulic systems are known. Usually such systems are coupled to the PTO output shaft with a hydraulic pump being driven by the PTO shaft. Such systems principally have been stand-alone systems that include a closed loop hydraulic system incorporating both a filter and a radiator for filtering and cooling the hydraulic fluid in the auxiliary system. Such systems are both bulky and expensive to manufacture because of the numerous components involved.

In at least one case, Vachon, U.S. Pat. No. 5,332,053 issued Jul. 26, 1994, the auxiliary hydraulic system is plumbed into the hydraulic system of the tractor itself and still includes a PTO driven hydraulic motor (utilized as a pump). Vachon at least implies and the hydraulic connections indicate that full hydraulic pump flow to the auxiliary hydraulic system is provided. Such flow takes pressure at a point where it could exceed 2,500 psi. Such pressure would likely blow the shaft seal out of the motor/pump. Hydraulic flow of such a device would likely be on the order of 20 gallons per minute.

There is a need then for a PTO driven hydraulic system that is both cooled and filtered by the hydraulic system of the tractor on which the PTO driven hydraulic system is mounted. Additionally, it is very desirable to minimize both the flow rate of the hydraulic fluid tapped from the tractor hydraulic system and the pressure of such fluid, thereby leaving the greatest portion of hydraulic capacity generated internally by the tractor to other tasks.

SUMMARY OF THE INVENTION

The present invention meets the aforementioned needs of the industry. The first embodiment of the present invention takes less than 1 gallon per minute of hydraulic fluid flow from the host tractor. Such hydraulic fluid flow is at a pressure of less than 50 pounds per square inch.

In an exemplary embodiment, the hydraulic fluid for the PTO driven hydraulic system is tapped from the charge pump flow to the hydrostatic transmission of the host tractor. Such oil comes from a certain one of two small gear pumps (about 4.2 gallons per minute). The oil first goes to the power steering of the host tractor, then to the PTO clutch control, and then the oil supply to the closed loop hydrostatic transmission of the host tractor. By tapping into such pressure point, 0.33 gallons per minute of the 4.2 gallons per minute flow is provided for the PTO driven hydraulic system. The hydrostatic transmission of the host tractor takes about 0.2 to 0.7 gallons per minute and the remainder of the flow (parallel flow) goes back to the transmission sump of the host tractor, which is at zero pressure. The exemplary input pressure to the pump of the PTO driven hydraulic system is 30 to 40 psi. No other relief valve or flow control device is needed in the closed hydraulic loop of the PTO driven hydraulic system. As noted above, the return from the PTO driven hydraulic system drains into the bottom of the tractor transmission sump at zero pressure. This small 0.33 gallon per minute flow fills the closed loop of the PTO driven hydraulic system, deaerates the hydraulic fluid, and circulates the 0.33 gallon per minute constantly. Such circulation is enough to filter and to cool the hydraulic fluid in the PTO driven hydraulic system internally in the tractor.

DETAILED DESCRIPTION OF THE DRAWINGS

Figure 1:
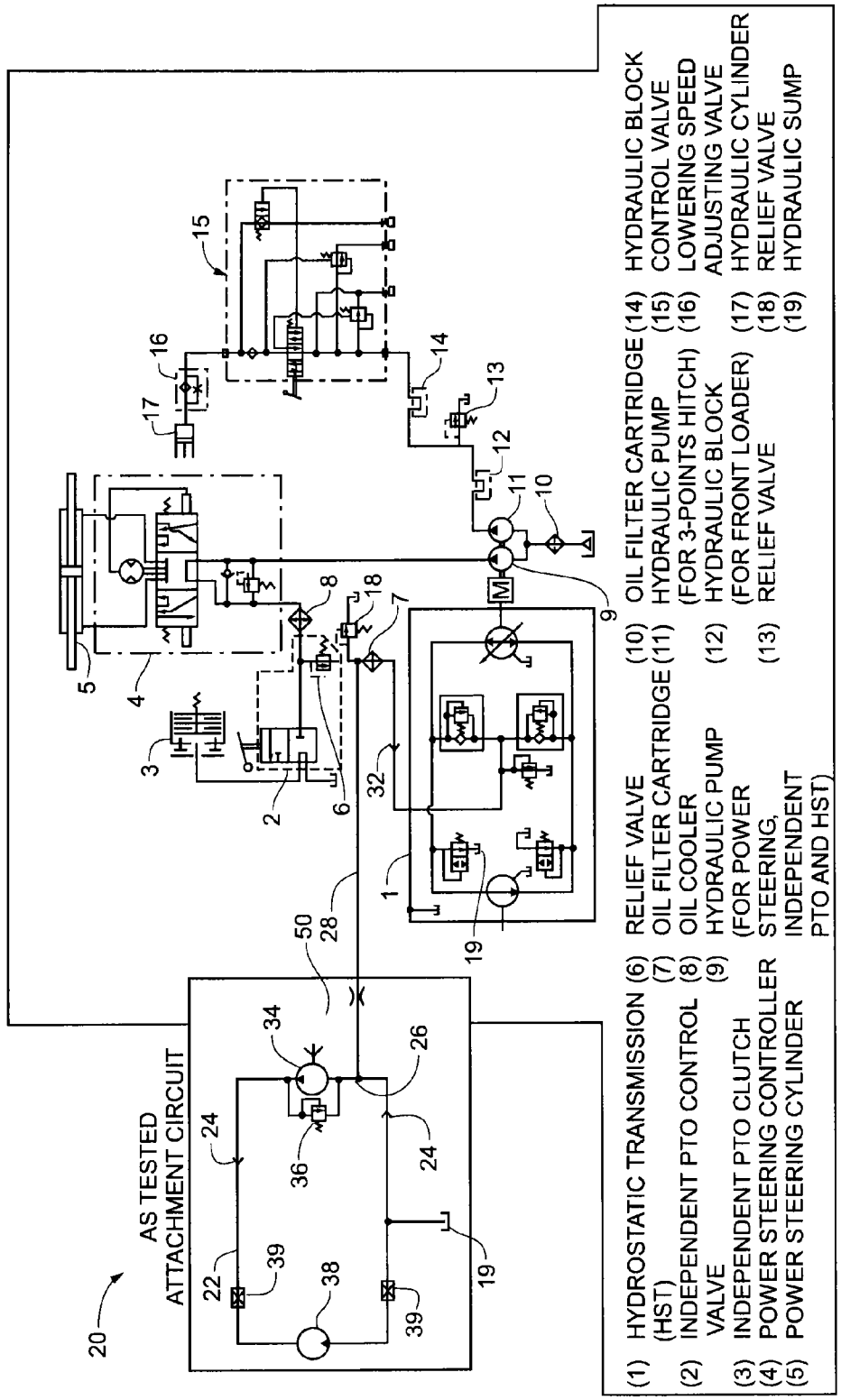
FIG. 1 is a schematic drawing of a rear mounted PTO driven hydraulic system of a first embodiment of the present invention tapped into the hydraulic circuit of the host tractor.
Figure 2:
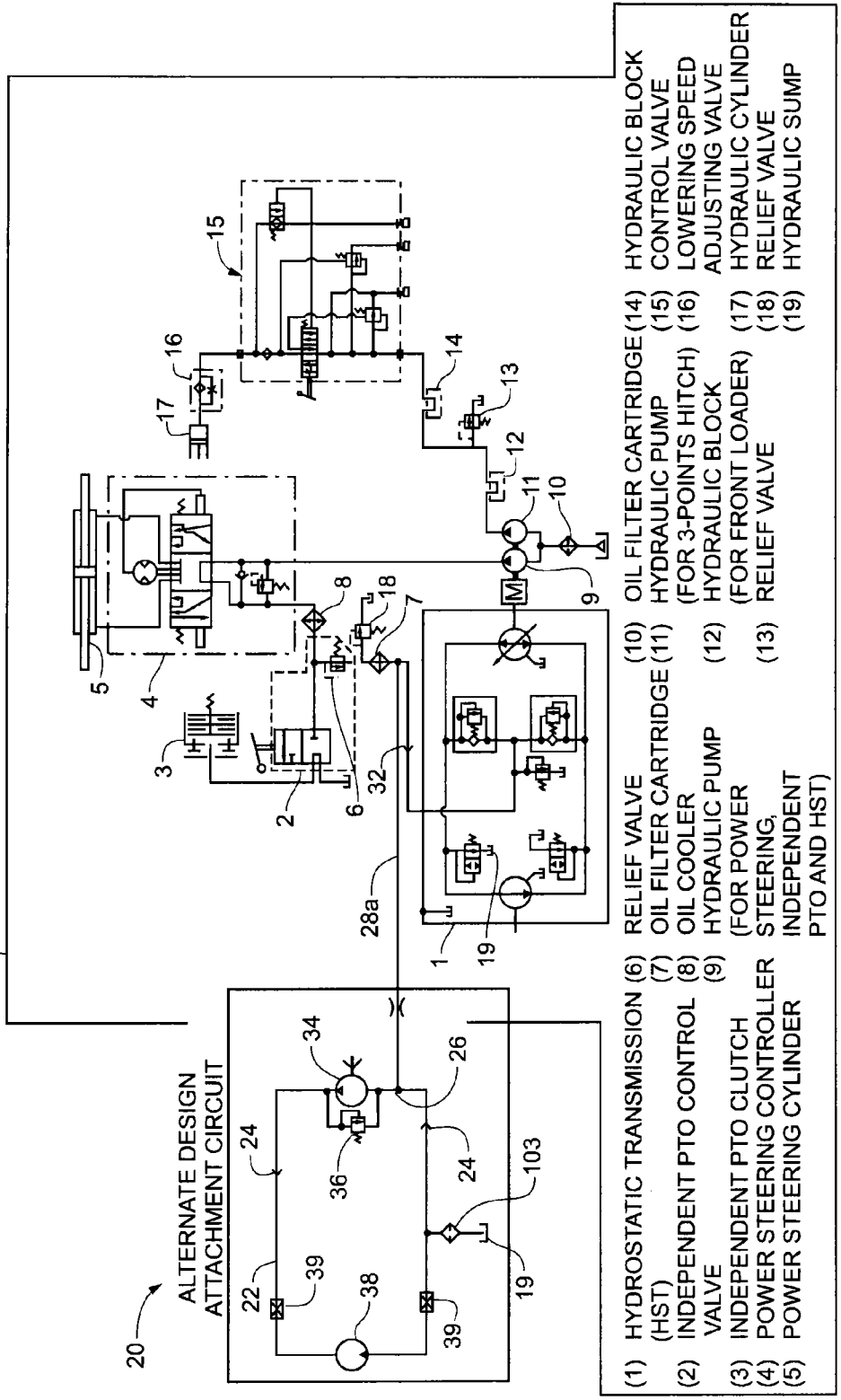
FIG. 2 is a circuit diagram of the PTO driven hydraulic system tapped in downstream of the oil filter cartridge of the host tractor hydraulic circuit.

The hydraulic circuit of the host tractor 100 is shown generally at 30 in FIGS. 1 and 2. The components of the hydraulic circuit 30 are noted as items 1-19 listed at the bottom of the schematic of the host tractor hydraulic circuit 30.

The PTO hydraulic driven system of the first embodiment of the present invention is shown generally at 20 and depicted on the left hand side of FIGS. 1 and 2. As will be noted below, the PTO driven hydraulic system 20 is tapped into the host tractor hydraulic circuit 30.

The PTO driven hydraulic system 20 has a closed loop hydraulic circuit 22. Flow in the hydraulic circuit 22 is as indicated at circuit flow arrows 24. The hydraulic fluid feed for the hydraulic circuit 22 is depicted at 26. Feed 26 is a T type coupling to feed line 28. In the depiction of FIG. 1, feed line 28 is coupled into the host tractor hydraulic circuit 30 between relief valve 6 and oil filter cartridge 7. In the depiction of FIG. 2, feed line 28a is coupled into the host tractor hydraulic circuit 30 between oil filter cartridge 7 and the hydrostatic transmission (HST) 1. The direction of hydraulic fluid flow to the hydrostatic transmission 1 one of the host tractor hydraulic circuit 30 is as indicated at 32.

A pump 34 is fluidly coupled into the hydraulic circuit 22. The pump 34 includes a relief valve 36 plumbed in parallel with the pump 34. The relief valve 36 is preferably opened at a hydraulic fluid pressure of between 3,000 and 4,000 psi.

A motor 38 is plumbed into the hydraulic circuit 22 to be driven by hydraulic fluid at the elevated pressure at the discharge of the pump 34. The motor 38 may be used to power any number of implements coupled to the host tractor 100. Such implements may include a snow blower (see FIG. 7), a rotary broom and a rotary mower and usually an integral component of such implement or a loader in which a hydraulic actuator(s) is substituted for the motor 38. Couplers 39 admit the motor 38 to the hydraulic circuit 22 and are preferably of the quick disconnect type so that a plurality of implements may be readily powered by the PTO driven hydraulic system 20.

Downstream of the motor 38 is a drain line 40 that drains into the hydraulic sump 19 of the hydrostatic transmission 1 of the host tractor hydraulic circuit 30. Note that in the embodiment of FIG. 2, a filter 103 is disposed in drain line 40. As noted above, the flow to the sump 19 is less than 0.5 gallons per minute and more preferably substantially 0.33 gallons per minute. The hydraulic fluid that is returned to the sump 19 is then cooled and filtered internally in the host tractor hydraulic circuit 30 and eventually returned to the PTO driven hydraulic system 20.

Figure 3:
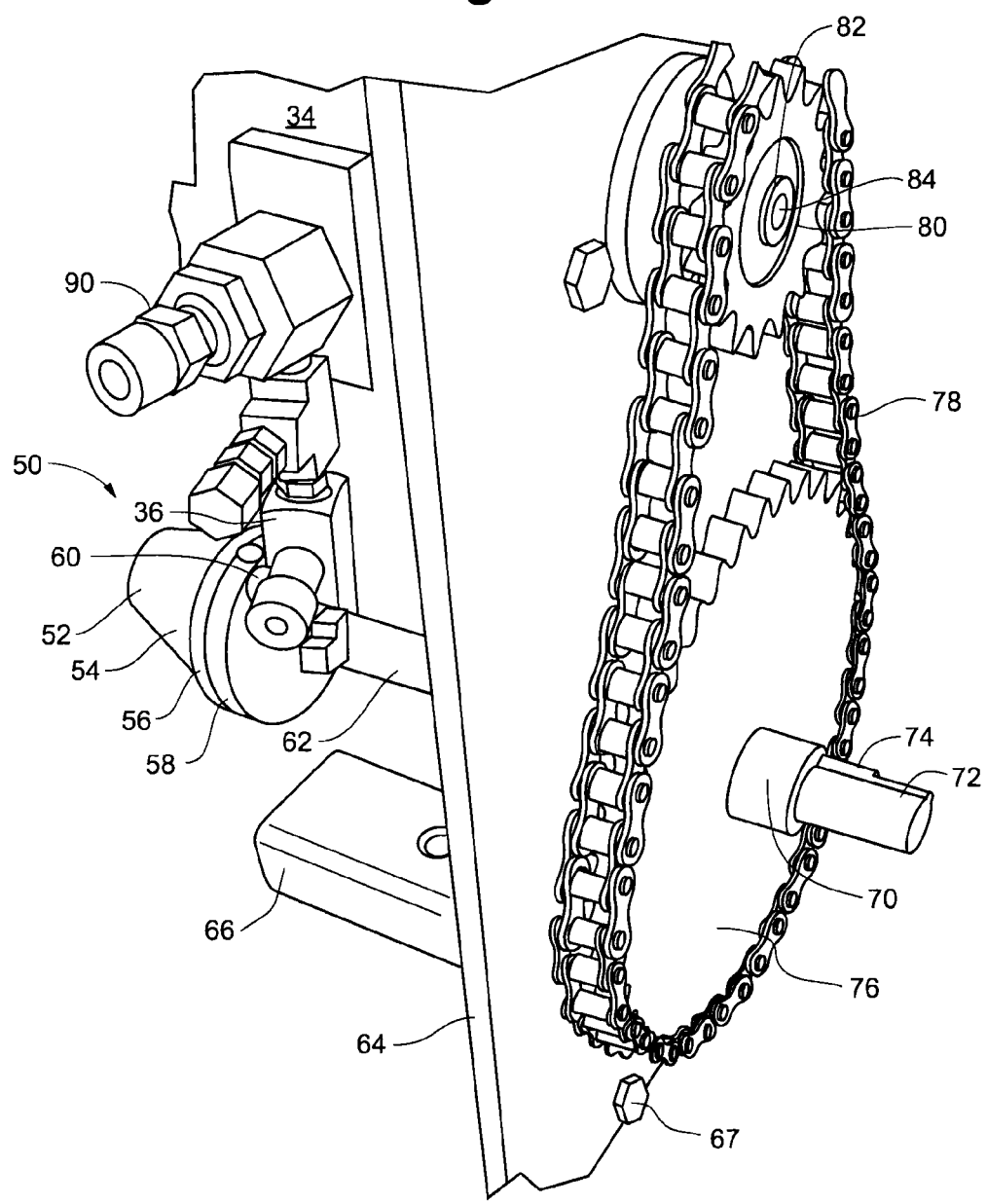
FIG. 3 is a perspective view of the pump and gearing of the PTO driven hydraulic system of the present invention.
Figure 4:
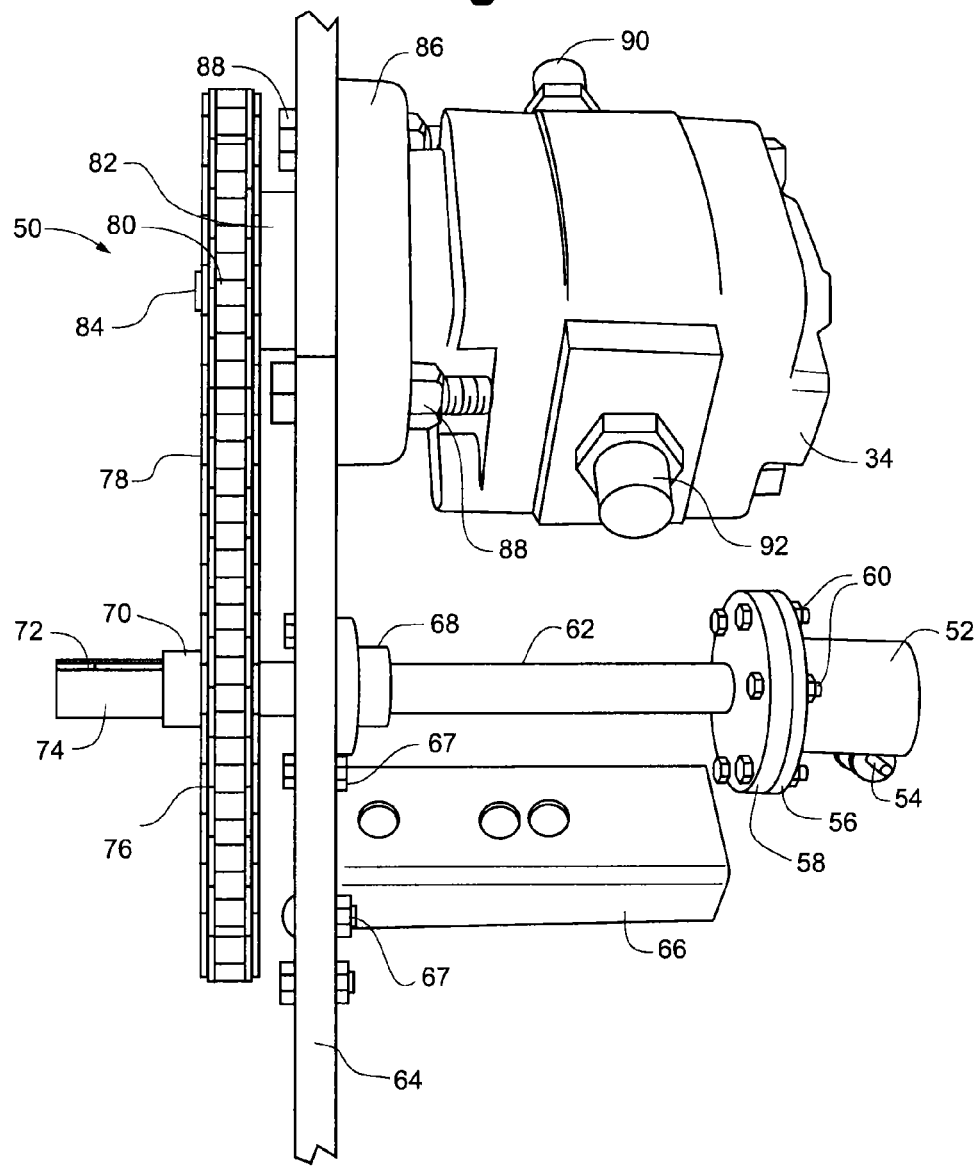
FIG. 4 is a side elevational view of the pump and gearing of the PTO driven hydraulic system of FIG. 3.

Referring to FIGS. 3 and 4, the PTO drive assembly is depicted generally at 50. The PTO drive assembly 50 is intended to be coupled to a rear mounted, rear facing PTO of the host tractor. Such PTOs are rotated at either 540 or 100 RPM, by SAE standard. The PTO drive assembly 50 includes a PTO coupler 52. The PTO coupler 52 typically has a splined interior bore that is designed to be mated to the splines of the PTO shaft of the host tractor 100. A spring loaded coupler lock 54 insures that, once mated to the PTO shaft of the host tractor 100, the PTO coupler 52 does not become disengaged therefrom without user action. The PTO coupler 52 further includes a flange 56.

A shaft flange 58 is abutted to a face of the flange 56 and secured thereto by means of bolts 60 disposed in bores in registry defined in the respective flanges 56, 58.

A drive shaft 62 is coupled to the shaft flange 58. The drive shaft 62 passes through a bore defined in a mount plate 64 and is held in a rotatable disposition therewith by means of a bushing 68. A mount bracket 66 is coupled to the mount plate 64 by means of bolts 67. The mount bracket 66 is utilized to detachably couple the mount plate 64 (and thereby, the PTO drive assembly 50) to the host tractor 100.

A gear hub 70 is fixedly coupled to the drive shaft 62 by means of a key 74 disposed in a keyway 72 defined in the drive shaft 62. The gear hub 70 supports a drive gear 76. A simplex chain 78 is disposed on the teeth of the drive gear 76. The simplex chain 78 further engages the teeth of a driven gear 80. In a preferred embodiment, the ratio of the drive gear to the driven gear is substantially 3 to 1. A typical PTO revolution is 540 rpm.

The driven gear 80 includes a gear hub 82 that is preferably coupled by means of a keyway and key (not shown) to a motor drive shaft 84.

The motor drive shaft 84 comprises the rotatable input shaft to the pump 34. The pump 34 further includes a mounting flange 86 for mounting to the mount plate 64 by means of bolts 88. The pump 34 includes an input fitting 90 and an output fitting 92 that comprise couplers into the hydraulic circuit 22.

Figure 5:
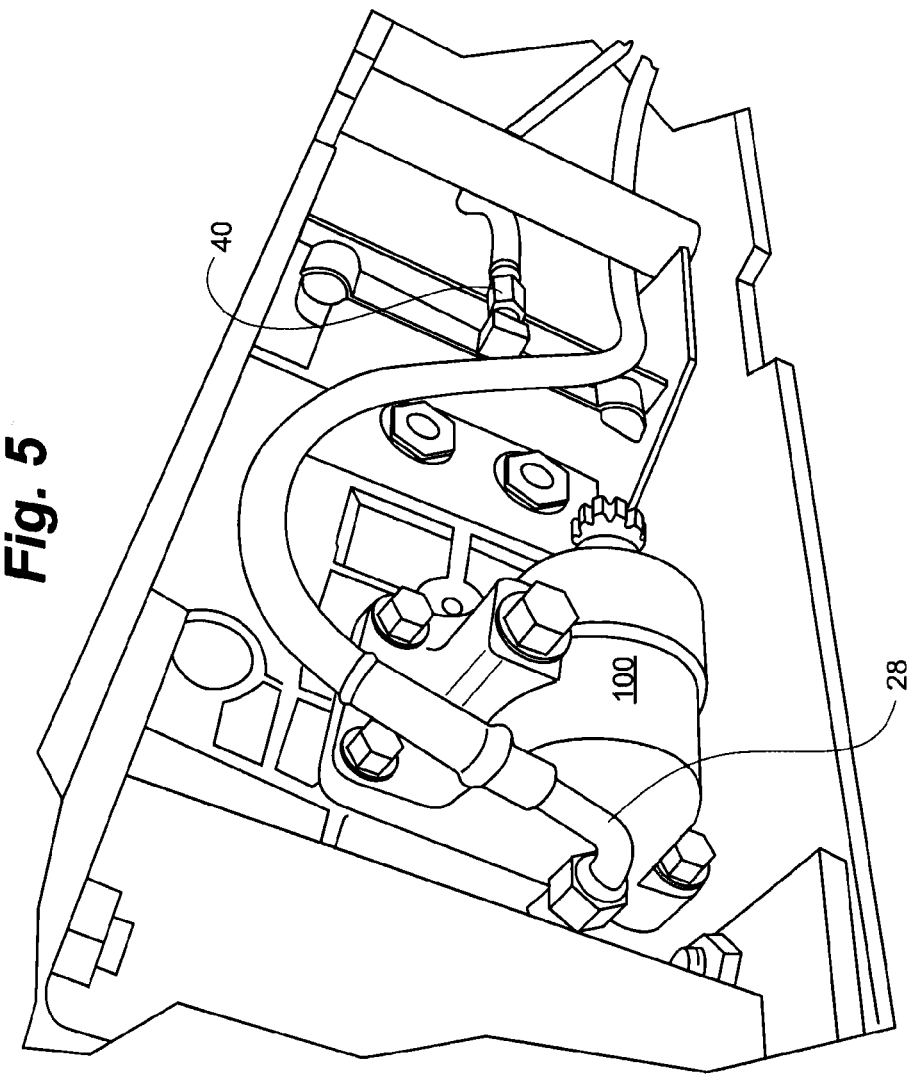
FIG. 5 is an underside view of the host tractor depicting the feed line and drain line of the PTO driven hydraulic system.
Figure 6:
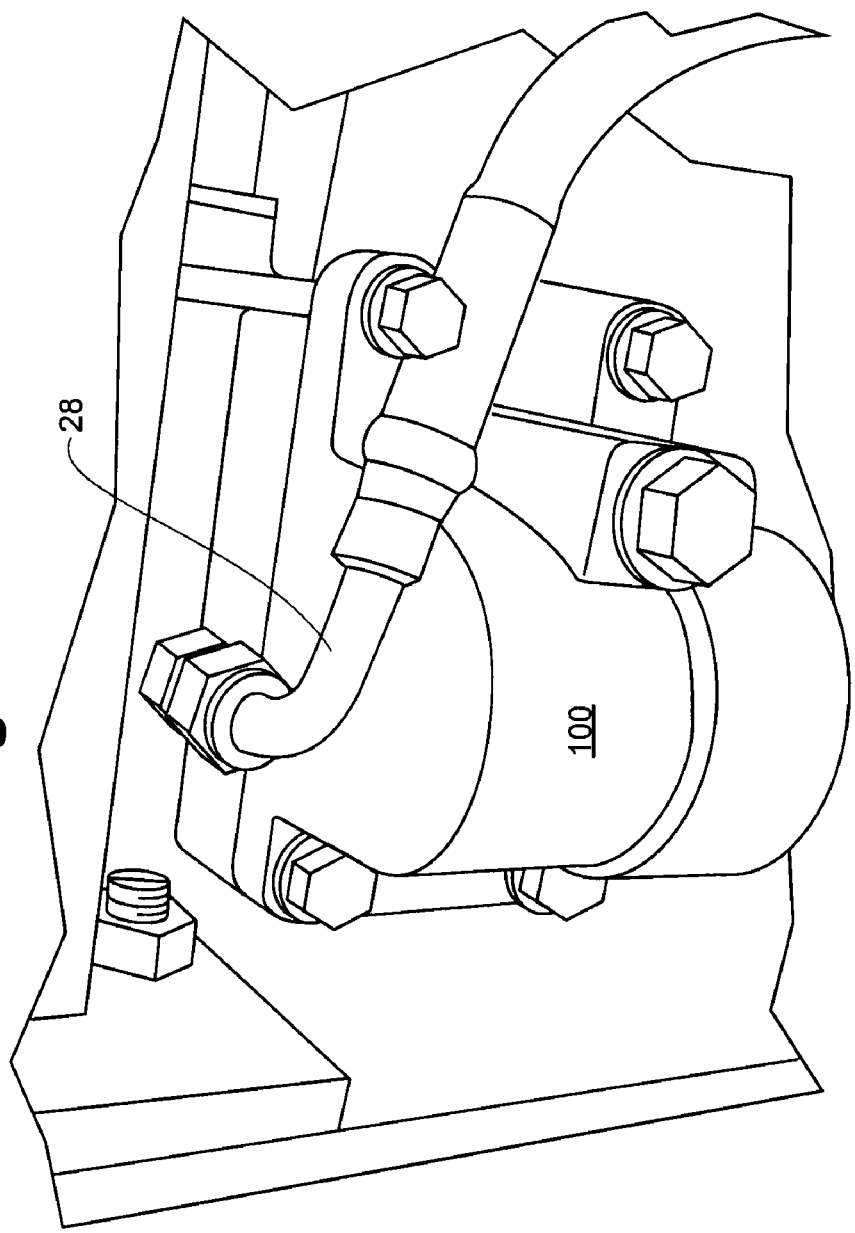
FIG. 6 is an underside view of the host tractor depicting the feed line for the PTO driven hydraulic system.

Referring to FIGS. 5 and 6, the feed line 28 and drain line 40 coupled to the host tractor hydraulic circuit 30 are depicted.

Figure 7:
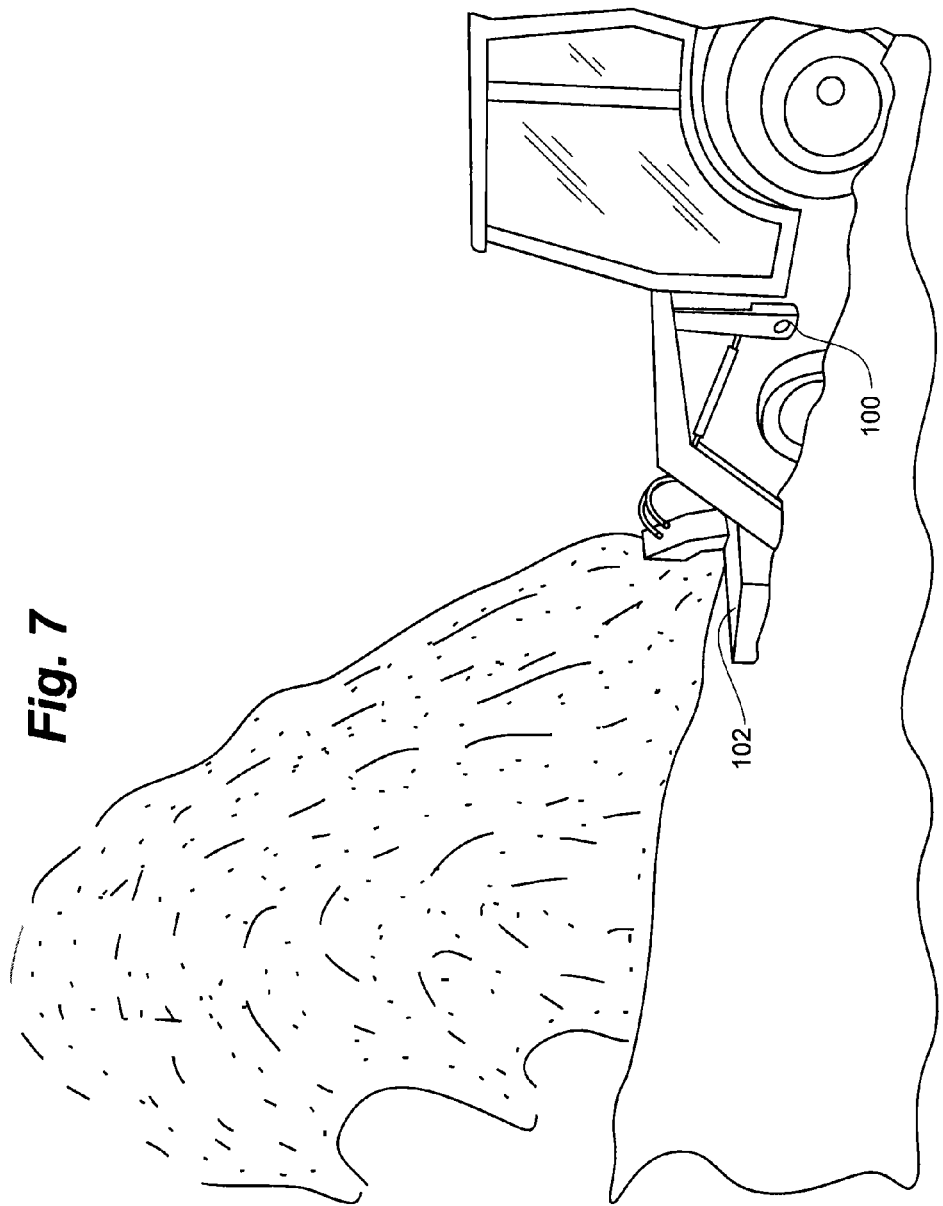
FIG. 7 is a perspective view of a tractor mounted hydraulically actuated snow blower in operation and powered by the PTO driven hydraulic system of the present invention.

Referring to FIG. 7, a snow blower 102 is depicted coupled to the host tractor 100. The various components of the snow blower 102 are hydraulically actuated by the motor 38 of the PTO driven hydraulic system 20.

Many utility-type tractors made today have a forward facing mid-mounted PTO in addition to the rear mounted, rear facing PTO noted above. It should be noted that the rear facing, rear-mounted PTOs are governed by SAE Specifications and turn at either 540 or 1000 rpm at a given rpm of the tractor engine. The forward-facing, mid-mounted PTOs are not governed by the SAE and consequently, the manufacturers of the utility tractors have provided a high speed PTO, typically turning in the region of about 2500 rpm.

The full power drive system 120 of the second embodiment of the present invention is driven from the mid-PTO drive of the tractor. By using the high rpm mid-PTO drive, the pump 134 of the full power drive system 120 is coupled directly to the splined output shaft 152 of the mid-PTO 150. As a result of being coupled to the high rpm mid-PTO drive 150, the need for a gearing system in reference to the first embodiment as described above that increases the input rpm to the pump 34 is eliminated. An additional advantage of the full power drive system 120, is that hydraulic hoses are kept short (as compared to the first embodiment rear mounting disposition) and the installation of the full power drive system 120 is significantly simplified. Additionally, the tractor's rear 540 rpm (or 1000 rpm) PTO and the tractor's three point hitch and draw bar remain open for other uses.

The closed loop hydraulic system of the full power drive system 120 uses the cooled transaxle oil from the tractor 100 to provide the oil for the mid-mount PTO pump 134. The cooled transaxle oil is delivered by the pump 134 to the hydraulic devices on the implement to be operated. Most of the oil is then filtered and returned directly back to the pump 134. A small amount of filtered oil, (two to four gallons per minute) flows back to the tractor 100 where it is cooled internally in the tractor 100. This "charge" oil flow is controlled by a pre-set flow control that is connected to the implement pump of the tractor. By using a small, controlled amount of oil out of a tractor's hydraulic system, the device of the present invention eliminates the need for a rear mounted hydraulic reservoir and cooler.

Figure 9:
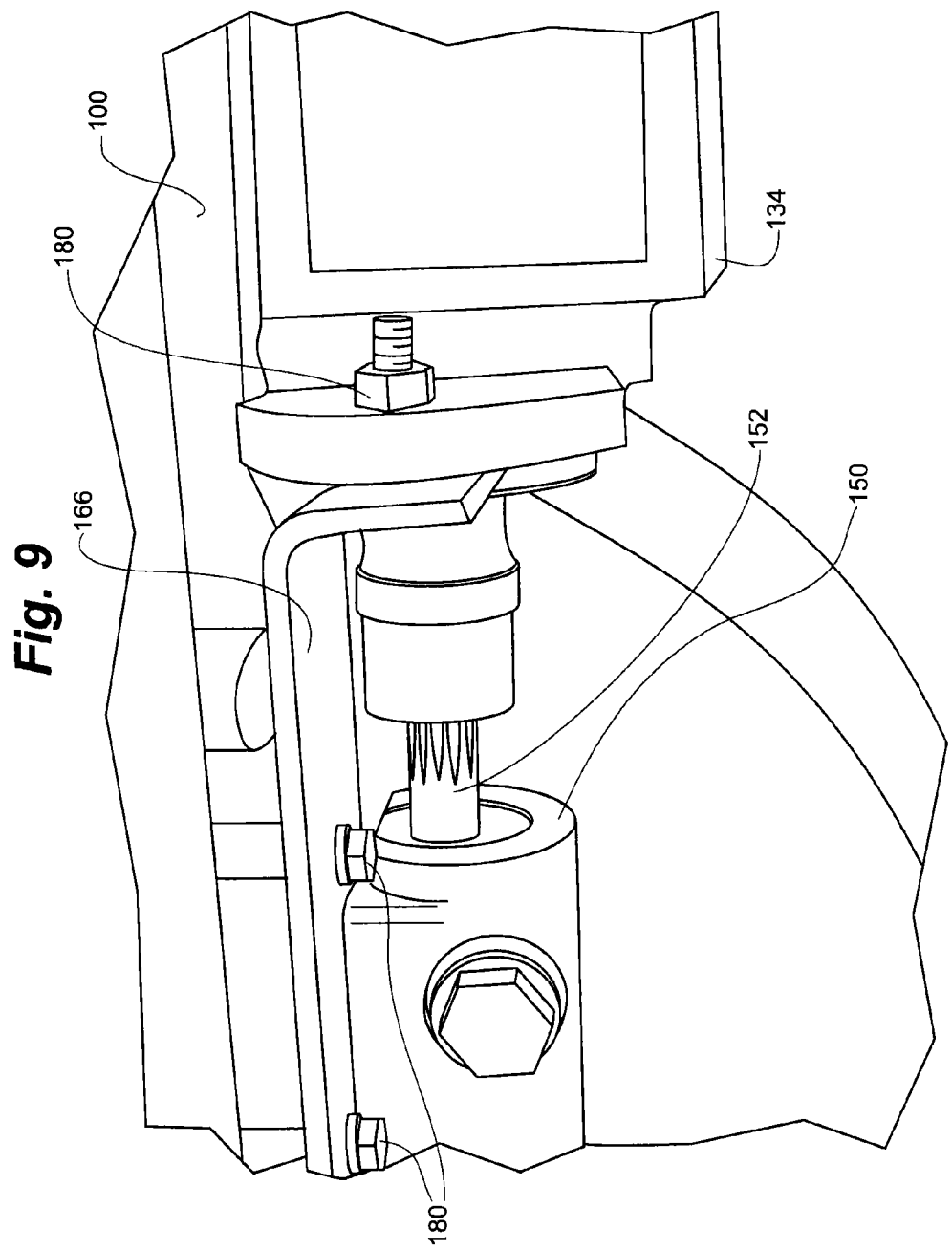
FIG. 9 is a side perspective view of the mid mounted PTO coupled to the pump of the hydraulic system of FIG. 8.

Referring to FIG. 9, the full power drive system of the present embodiment is depicted generally at 120. The drive system 120 includes a closed loop hydraulic circuit 122 having in effect two hydraulic loops. Hydraulic flow in the hydraulic circuit 122 is as indicated by arrows 124. A first hydraulic loop includes a relatively small diameter hydraulic feed line 126 that is fluidly connected into the hydraulic system of the tractor 100 by a connector 127a.

Figure 12:
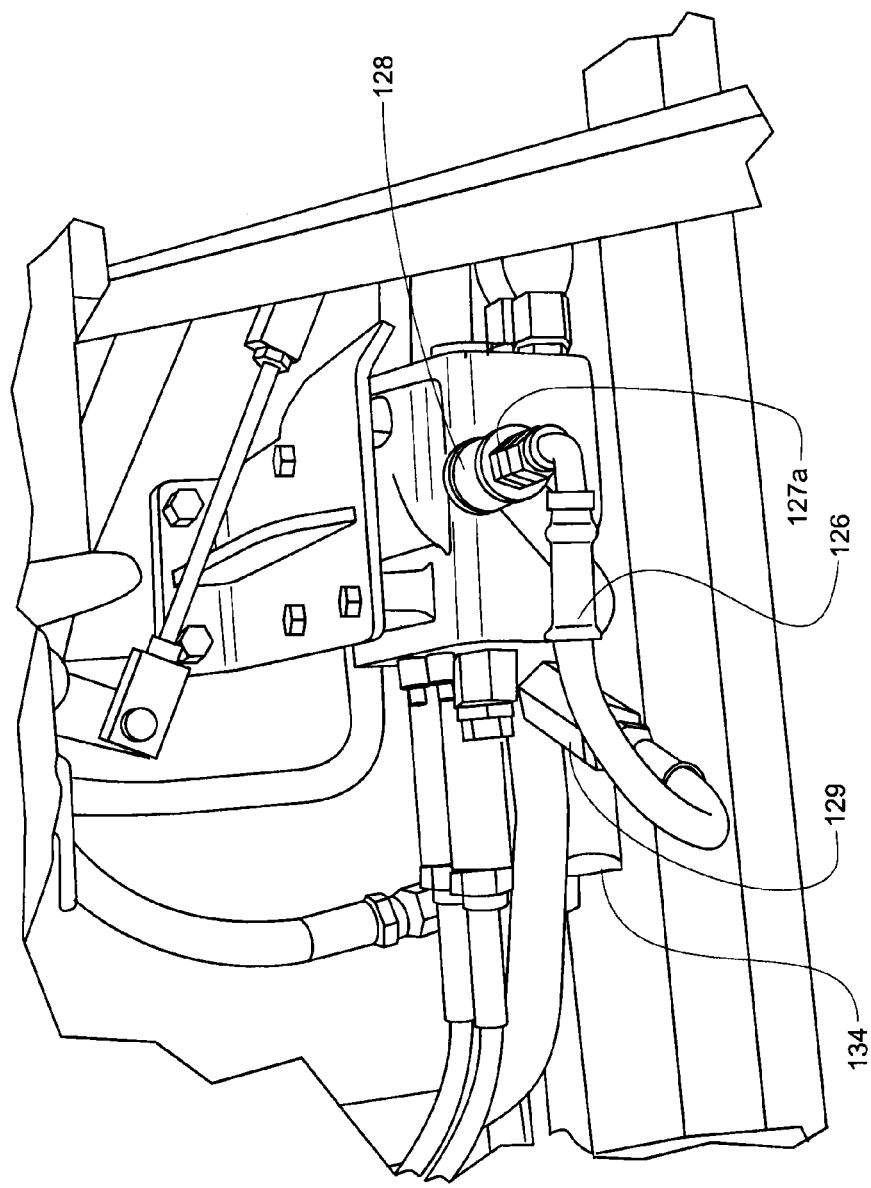
FIG. 12 is a side perspective view of the hydraulic feed line of the hydraulic system of FIG. 8 as it is coupled to the host tractor.

Referring to FIG. 12, connector 127a for the hydraulic feed line 126 can be seen coupled to a source of hydraulic fluid that is a component of the tractor 100. Tapping into the hydraulic system of the tractor 100 varies from tractor-type to tractor-type, but in this case an existing hydraulic fitting 128 was bolted to the pressure side of the hydraulic system of the tractor 100. To gain access to the hydraulic fluid under pressure at this point, a bore was defined in the bolt that held the fitting 128 in place and the bore was threaded. The connector 127a was then simply threaded into the bore to effect the hydraulic connection, the fitting 128 being left in place.

Figure 8:
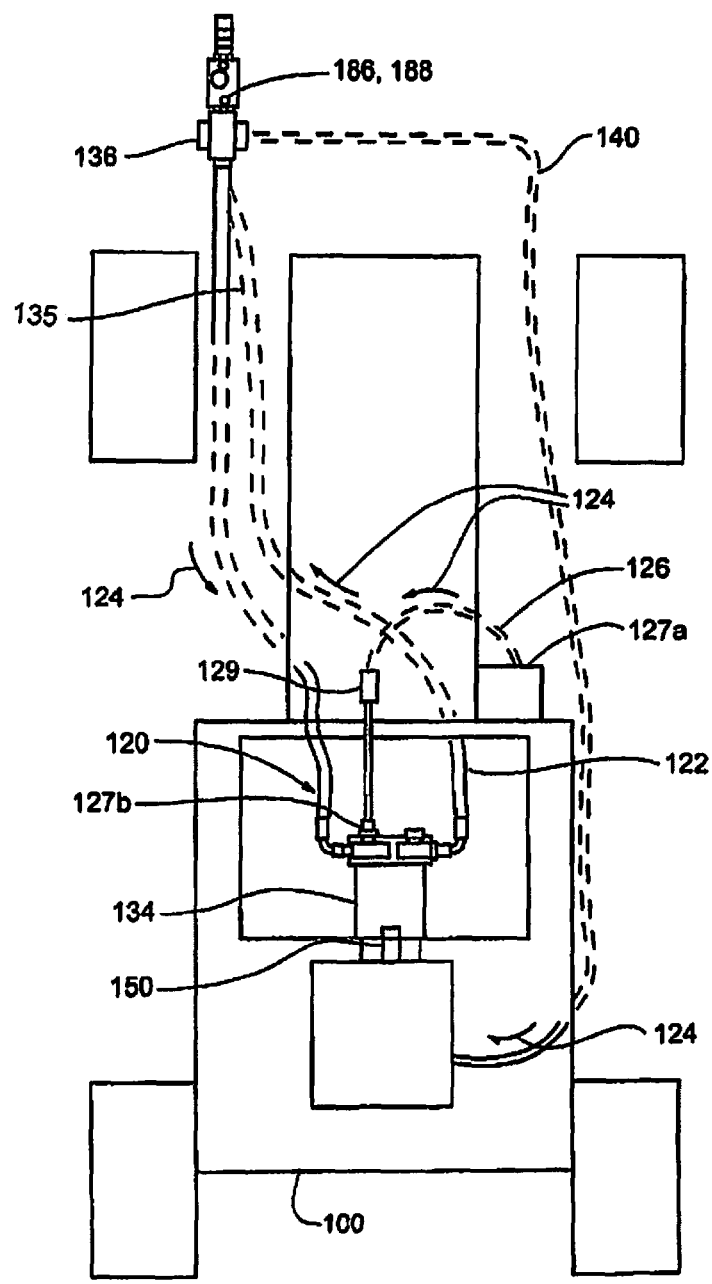
FIG. 8 is a schematic drawing of a mid mounted PTO driven hydraulic system of a second embodiment of the present invention tapped into the hydraulic circuit of the host tractor.
Figure 13:
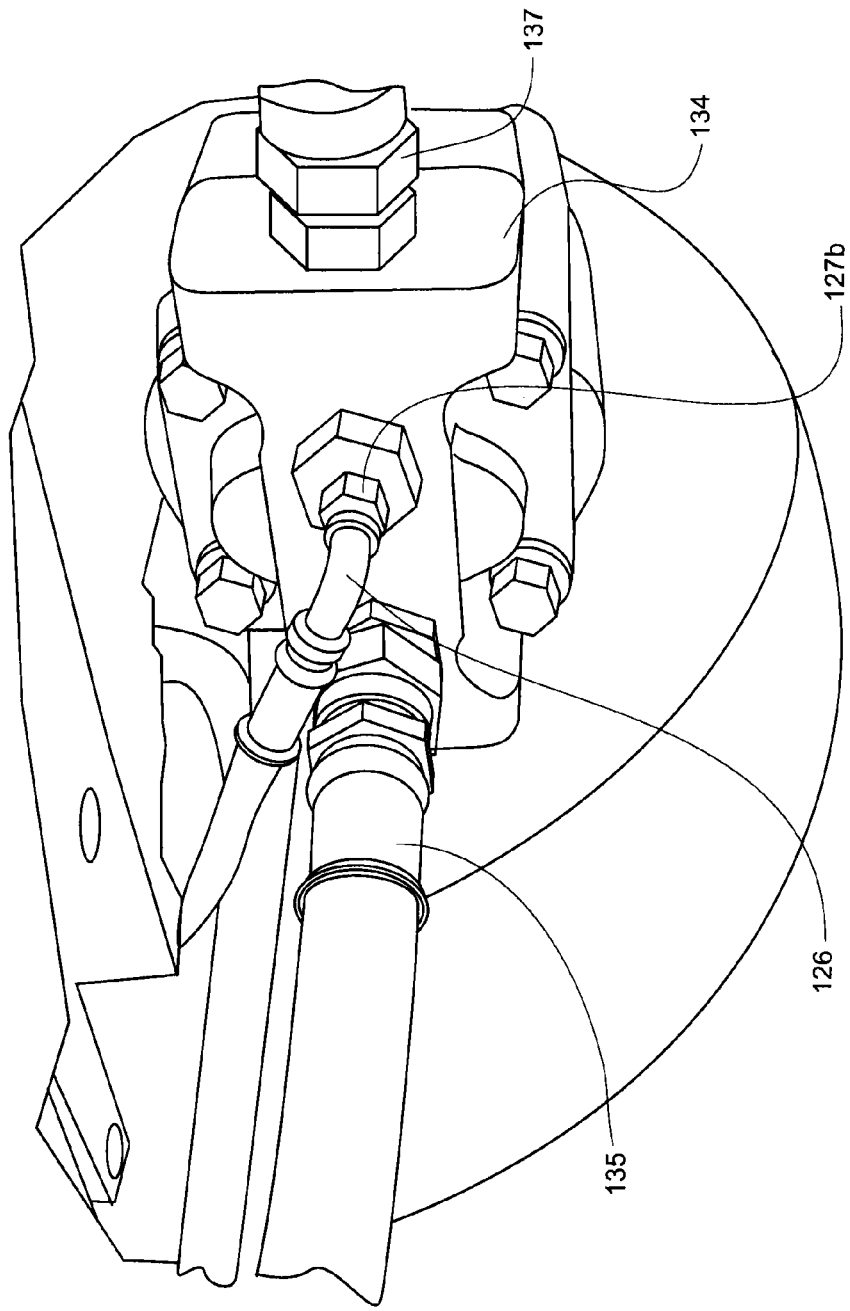
FIG. 13 is a front quartering perspective view of the pump of the hydraulic system of FIG. 8.

The hydraulic feed line 126 provides feed hydraulic flow from the hydraulic system of the tractor 100 to the pump 134. This flow is cooled internally in the hydraulic system of the tractor 100. The output of the pump 134 is a high pressure hydraulic line 135, as depicted in FIGS. 8 and 13. The high pressure line 135 is preferably minimally a ⅝ inch hose and is preferably a ¾ inch hose for a 22.0 gallons per minute rated pump 134 or greater. The pressure line 135 provides high pressure, high volume hydraulic fluid to the implement to be operated.

A return or suction line 137, as depicted in FIGS. 8 and 13, provides for a return to the pump 134 of essentially zero pressure hydraulic fluid from the implement to be driven. A very high percentage of the flow in line 135 is returned to the pump 134 by line 137.

Figure 14:
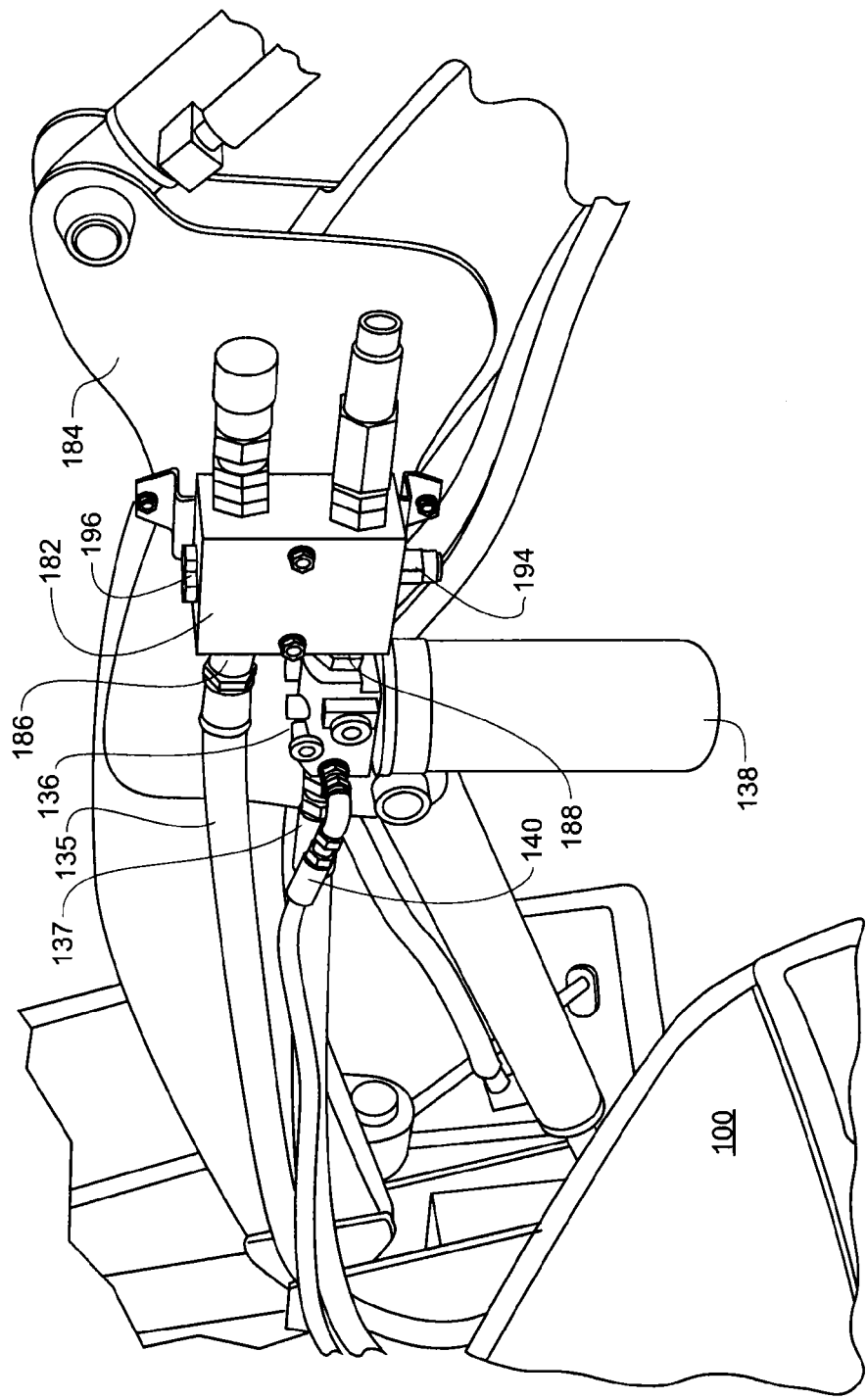
FIG. 14 is a perspective view of the filter head and control block of the hydraulic system of FIG. 8.
Figure 15:
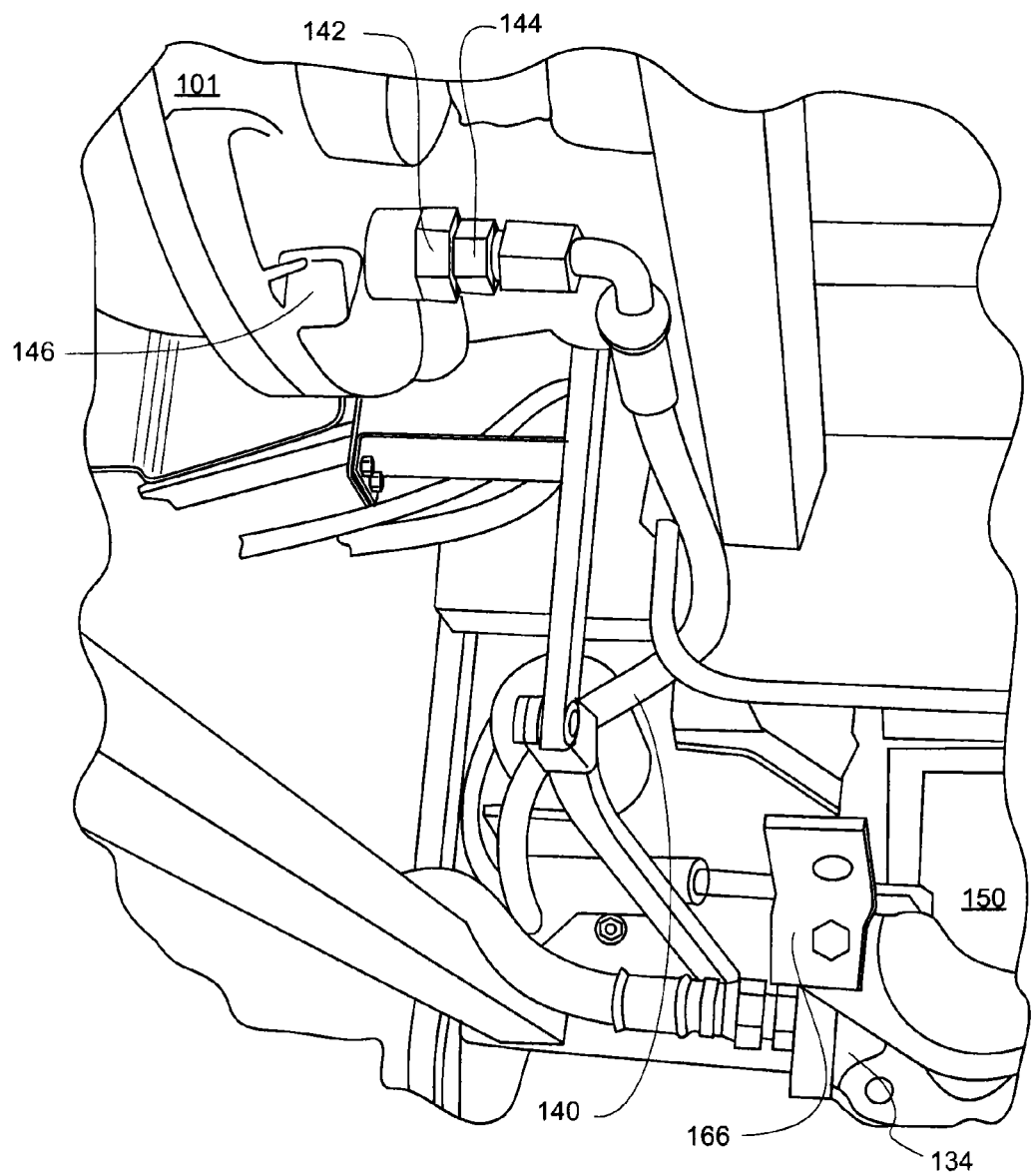
FIG. 15 is a perspective view of the drain line of the hydraulic system of FIG. 8 coupled to the transmission sump of the host tractor.

The pressure line 135 is coupled to a control block 182 (described below) and the return line 137 are coupled to a filter head 136, as depicted in FIGS. 8 and 14. The filter head 136 has a depending, replaceable hydraulic filter 138. A drain line 140 is fluidly coupled to the filter head 136. The drain line 140 extends from the filter head 136 to the hydraulic system of the tractor 100 and returns a very small percentage of the flow delivered by to line 135 to the tractor 100. In the exemplary system noted herein, the drain line 140 provides for a return flow to the tractor 100 transmission reservoir 101 as noted in FIG. 15. Return to the tractor hydraulic system can be effected by any number of means where the tractor hydraulic system is at essentially zero pressure, such as in a sump. In the exemplary system, a drain plug 142 on the tractor transmission sump 146 was drilled and tapped and a connector 144 on the drain line 140 was simply threaded therein. Accordingly, the hydraulic circuit 122 includes a hydraulic circuit for providing the hydraulic drive for the implement to be driven being a closed loop effected by the pressure line 135 and the return line 137. The hydraulic circuit 122 additionally includes the hydraulic fluid to be cooled internally by the hydraulic system of the tractor 100 and supplied to the pump 134. This circuit is also a closed loop and is effected by hydraulic feed line 126 and drain line 140.

Figure 10:
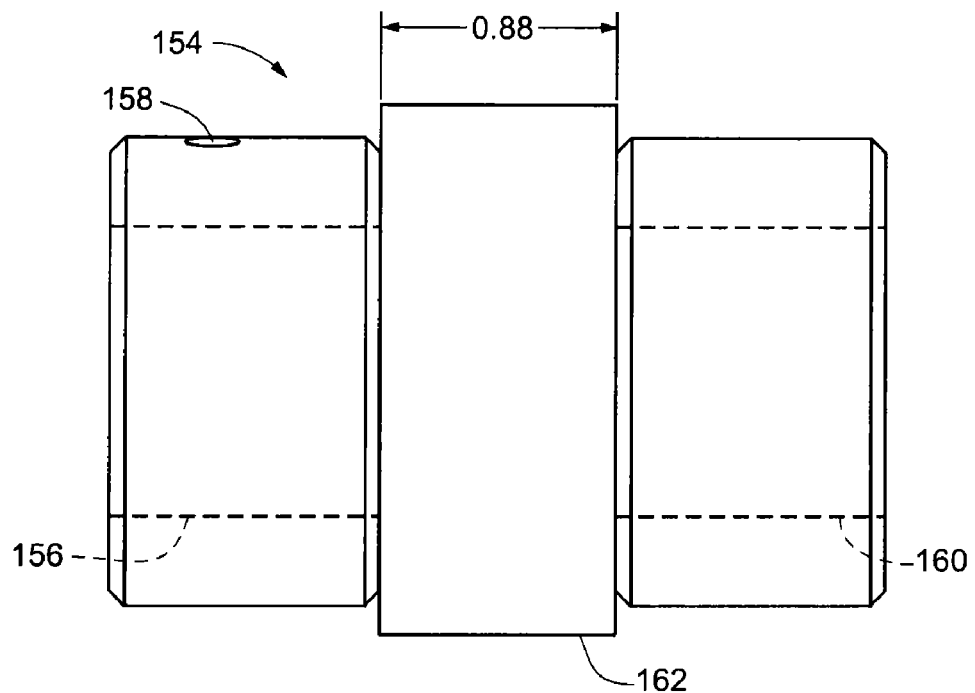
FIG. 10 is side elevational view of the coupler for coupling the PTO shaft to the pump of the hydraulic system of FIG. 8.

The mid-mounted pump 134 is best depicted in FIGS. 8, 9 and 13. Preferably, pump 134 is a pump made by the company Permco, Inc., Streetsboro, Ohio, USA. The capacity of the pump 134 is preferably selected as a function of the horsepower rating of the tractor 100. Accordingly, higher horsepower tractors 100 have higher capacity pumps 134 and conversely, lower horsepower tractors 100 have lower capacity pumps 134. In the exemplary embodiment depicted, the pump 134 is rotationally coupled to the mid-mounted PTO 150. The pump 134 is coupled to the splined output shaft 152 of the mid-mounted PTO 150 by means of a coupler 154. The coupler 154 is depicted in FIGS. 9 and 10. The coupler 154 is preferably an integral device having a splined input bore 156, and a splined output bore 160 with a center disposed body 162. A set screw bore 158 may be defined in the portion of the coupler 154 that defines the splined input bore 156. It should be noted that the entire coupler 154 rotates with rotation of the splined output shaft 152 of the mid-mounted PTO 150.

Figure 11:
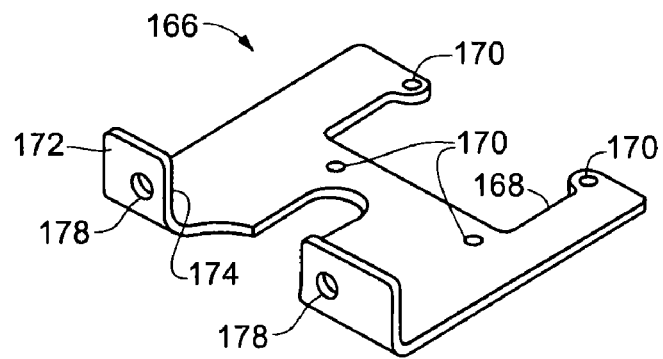
FIG. 11 is a perspective view of the pump mount bracket of the hydraulic system of FIG. 8.

Referring to FIG. 9, the pump 134 is mounted to the tractor 100 by means of a bracket 166. Reference may be made to FIG. 11 for details of the construction of the bracket 166. The bracket 166 has an aperture 168 defined therein that effectively encloses the mid-mounted PTO 150 on three sides. Tractor mount bores 170 are defined in the bracket 166. An orthogonally disposed flange 172 is disposed opposite the aperture 168. The flange 172 has a coupler aperture 174 centrally defined therein in order to accommodate the coupler 154. The flange 172 has pump mount bores 178 defined therein. Respective bolts 180 disposed in the tractor mount bores 170 and the pump mount bores 178 respectively couple the bracket 166 to the tractor 100 and the pump 134 to the bracket 166.

The finale component of the full power drive system 120 is the control block 182, as depicted in FIGS. 8 and 14. In the exemplary embodiment, the control block 182 is mounted to the loader arms 184 of the tractor 100.

The control block 182 has an input port 186 coupled to the pressure line 135 and an output port 188 coupled to the filter head 136. A high pressure flat-face coupler 190 is disposed opposite the input port 186 and a return flat-face coupler 192 is disposed opposite the output bore 188. Hydraulic hoses from the implement to be operated may be coupled to the couplers 190, 192.

A relief valve 194 is disposed on the underside of the control block 182. The relief valve 194 acts to port hydraulic fluid from the high pressure side of the control block 182 to the return side of the control block 182 in the event that hydraulic pressure gets excessive.

An anti-cavitation valve 196 is disposed on the upper margin of the control block 182. The anti-cavitation valve 196 is useful when the full power drive system 120 is powering a rotating device. Without the anti-cavitation valve 196, shutting off the full power drive system 120 would cause the rotating implement to potentially harmfully immediately cease rotation. The anti-cavitation valve 196 permits the rotating implement to gradually wind down to a stop upon the full power drive system 120 being turned off by permitting hydraulic fluid to take the path of least resistance.

The embodiments above are intended to be illustrative and not limiting. Additional embodiments are within the claims. In addition, although the present invention has been described with reference to particular embodiments, those skilled in the art will recognize that changes can be made in form and detail without departing from the spirit and scope of the invention. Any incorporation by reference of documents above is limited such that no subject matter is incorporated that is contrary to the explicit disclosure herein.

The invention claimed is:

1. A hydraulic system operably coupled to a vehicle, the vehicle having at least one PTO drive and having a hydraulic system for, in part, cooling hydraulic fluid, comprising:
 a closed hydraulic circuit having at least a first hydraulic loop and at least a second hydraulic loop, a pump being a component of each of the at least a first hydraulic loop and the at least a second hydraulic loop, the pump being operably, rotatably coupled to the PTO drive, a gear drive being interposed between the PTO drive and the pump, the first hydraulic loop having a feed line fluidly coupled to the vehicle hydraulic system and to the pump and a return line in fluid communication with the pump and operably, fluidly coupled to the vehicle hydraulic system; and
 the second hydraulic loop having a pressure line fluidly coupled to a output of the pump and a return line fluidly coupled to a pump return inlet, the second hydraulic loop being fluidly couplable to an implement for providing hydraulic power thereto.

2. The hydraulic system of claim 1 wherein the gear drive acts to step up PTO drive rpm to a greater rpm for driving the pump.

3. A hydraulic system being operably coupled to a vehicle, the vehicle having at least one PTO drive and having a hydraulic system for, in part, cooling hydraulic fluid, comprising:
- a closed hydraulic circuit having at least a first hydraulic loop and at least a second hydraulic loop, a pump being a component of each of the at least a first hydraulic loop and the at least a second hydraulic loop, the pump being operably, rotatably coupled to the PTO drive, the first hydraulic loop having a feed line fluidly coupled to the vehicle hydraulic system and to the pump and a return line in fluid communication with the pump and operably, fluidly coupled to the vehicle hydraulic system;
- the second hydraulic loop having a pressure line fluidly coupled to a output of the pump and a return line fluidly coupled to a pump return inlet, the second hydraulic loop being fluidly couplable to an implement for providing hydraulic power thereto; and
- being adapted for coupling to a mid mounted, forward directed PTO drive.

4. A hydraulic system being operably coupled to a vehicle, the vehicle having at least one PTO drive and having a hydraulic system for, in part, cooling hydraulic fluid, comprising:
- a closed hydraulic circuit having at least a first hydraulic loop and at least a second hydraulic loop, a pump being a component of each of the at least a first hydraulic loop and the at least a second hydraulic loop, the pump being operably, rotatably coupled to the PTO drive, the first hydraulic loop having a feed line fluidly coupled to the vehicle hydraulic system and to the pump and a return line in fluid communication with the pump and operably, fluidly coupled to the vehicle hydraulic system;
- the second hydraulic loop having a pressure line fluidly coupled to a output of the pump and a return line fluidly coupled to a pump return inlet, the second hydraulic loop being fluidly couplable to an implement for providing hydraulic power thereto; and
- being adapted for coupling to a PTO drive that is operable at a rotational speed in excess of 2000 rpm.

5. A hydraulic system being operably coupled to a vehicle, the vehicle having at least one PTO drive and having a hydraulic system for, in part, cooling hydraulic fluid, comprising:
- a closed hydraulic circuit having at least a first hydraulic loop and at least a second hydraulic loop, a pump being a component of each of the at least a first hydraulic loop and the at least a second hydraulic loop, the pump being operably, rotatably coupled to the PTO drive, the first hydraulic loop having a feed line fluidly coupled to the vehicle hydraulic system and to the pump and a return line in fluid communication with the pump and operably, fluidly coupled to the vehicle hydraulic system;
- the second hydraulic loop having a pressure line fluidly coupled to a output of the pump and a return line fluidly coupled to a pump return inlet, the second hydraulic loop being fluidly couplable to an implement for providing hydraulic power thereto; and
- being adapted for coupling to a PTO drive that is operable at a rotational speed not to exceed 1000 rpm.

6. A hydraulic system and being operably coupled to a vehicle, the vehicle having at least one PTO drive and having a hydraulic system for, in part, cooling hydraulic fluid, comprising:
- a closed hydraulic circuit having at least a first hydraulic loop and at least a second hydraulic loop, a pump being a component of each of the at least a first hydraulic loop and the at least a second hydraulic loop, the pump being operably, rotatably coupled to the PTO drive, the first hydraulic loop having a feed line fluidly coupled to the vehicle hydraulic system and to the pump and a return line in fluid communication with the pump and operably, fluidly coupled to the vehicle hydraulic system;
- the second hydraulic loop having a pressure line fluidly coupled to a output of the pump and a return line fluidly coupled to a pump return inlet, the second hydraulic loop being fluidly couplable to an implement for providing hydraulic power thereto; and
- wherein a volume of hydraulic fluid is cycled to the vehicle hydraulic system for cooling.

7. A hydraulic system being operably coupled to a vehicle, the vehicle having at least one PTO drive and having a hydraulic system for, in part, cooling hydraulic fluid, comprising:
- a closed hydraulic circuit having at least a first hydraulic loop and at least a second hydraulic loop, a pump being a component of each of the at least a first hydraulic loop and the at least a second hydraulic loop, the pump being operably, rotatably coupled to the PTO drive, the first hydraulic loop having a feed line fluidly coupled to the vehicle hydraulic system and to the pump and a return line in fluid communication with the pump and operably, fluidly coupled to the vehicle hydraulic system;
- the second hydraulic loop having a pressure line fluidly coupled to a output of the pump and a return line fluidly coupled to a pump return inlet, the second hydraulic loop being fluidly couplable to an implement for providing hydraulic power thereto; and
- wherein a volume of cooled hydraulic fluid is provided to the pump from the vehicle hydraulic system.

8. A hydraulic system being operably coupled to a vehicle, the vehicle having at least one PTO drive and having a hydraulic system for, in part, cooling hydraulic fluid, comprising:
- a closed hydraulic circuit having at least a first hydraulic loop and at least a second hydraulic loop, a pump being a component of each of the at least a first hydraulic loop and the at least a second hydraulic loop, the pump being operably, rotatably coupled to the PTO drive, the first hydraulic loop having a feed line fluidly coupled to the vehicle hydraulic system and to the pump and a return line in fluid communication with the pump and operably, fluidly coupled to the vehicle hydraulic system;
- the second hydraulic loop having a pressure line fluidly coupled to a output of the pump and a return line fluidly coupled to a pump return inlet, the second hydraulic loop being fluidly couplable to an implement for providing hydraulic power thereto; and
- wherein hydraulic fluid in the closed hydraulic circuit is filtered before return to the pump and to the vehicle hydraulic system.

9. A method of forming a hydraulic system, the hydraulic system operably coupled to a vehicle, the vehicle having at least one PTO drive and having a hydraulic system for, in part, cooling hydraulic fluid, comprising:
- forming a closed hydraulic circuit having at least a first and a second hydraulic loop, a pump being a component of each of the at least a first and a second hydraulic loops, the pump being operably, rotatably coupled to the PTO drive, forming the first hydraulic loop having a feed line fluidly coupled to the vehicle hydraulic system and to the pump and a return line in fluid communication with the pump and operably, fluidly coupled to the vehicle hydraulic system; and forming the second hydraulic loop having a pressure line fluidly coupled to a output of the pump and a return line fluidly coupled to a pump return inlet, the second hydraulic loop being fluidly couplable to an implement for providing hydraulic power thereto.

10. The method of claim 9 including interposing a gear drive between the PTO drive and the pump.

11. The method of claim 10 including stepping up PTO drive rpm to a greater rpm for driving the pump by means of the gear drive.

12. The method of claim 9 including adapting the closed hydraulic circuit for coupling to a mid mounted, forward directed PTO drive.

13. The method of claim 9 including adapting the closed hydraulic circuit for coupling to a rear mounted, rearward directed PTO drive.

14. The method of claim 9 including adapting the closed hydraulic circuit for coupling to a PTO drive that is operable at a rotational speed in excess of 2000 rpm.

15. The method of claim 9 including adapting the closed hydraulic circuit for coupling to a PTO drive that is operable at a rotational speed not to exceed 1000 rpm.

16. The method of claim 9 including cycling a volume of hydraulic fluid to the vehicle hydraulic system for cooling.

17. The method of claim 9 including providing a volume of cooled hydraulic fluid to the pump from the vehicle hydraulic system.

18. The hydraulic system of claim 9 including filtering hydraulic fluid in the closed hydraulic circuit before returning the hydraulic fluid to the pump and to the vehicle hydraulic system.

* * * * *